(No Model.)  
J. L. BOGERT.  
ROTARY VALVE FOR STEAM ENGINES.  
No. 310,978. Patented Jan. 20, 1885.
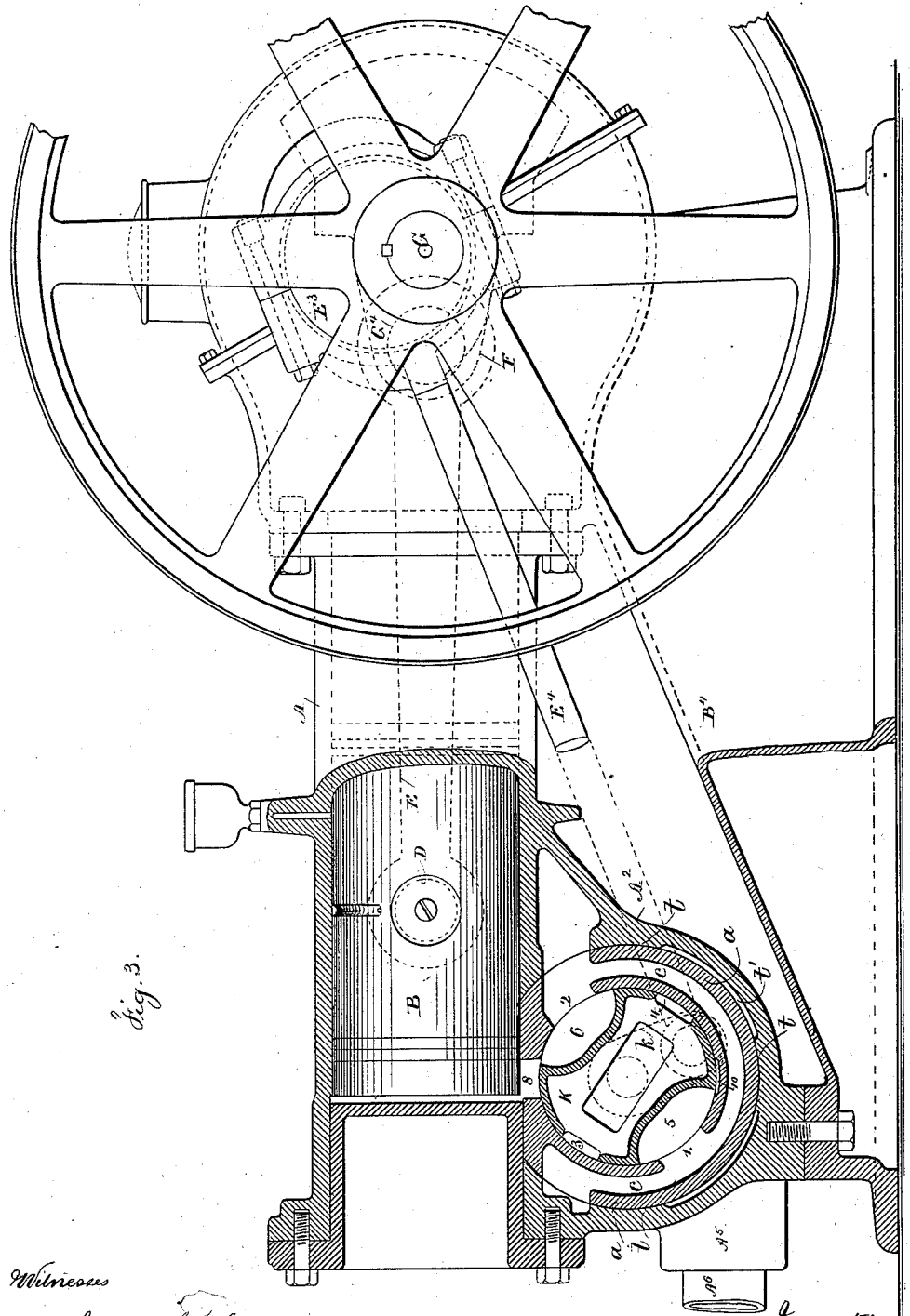

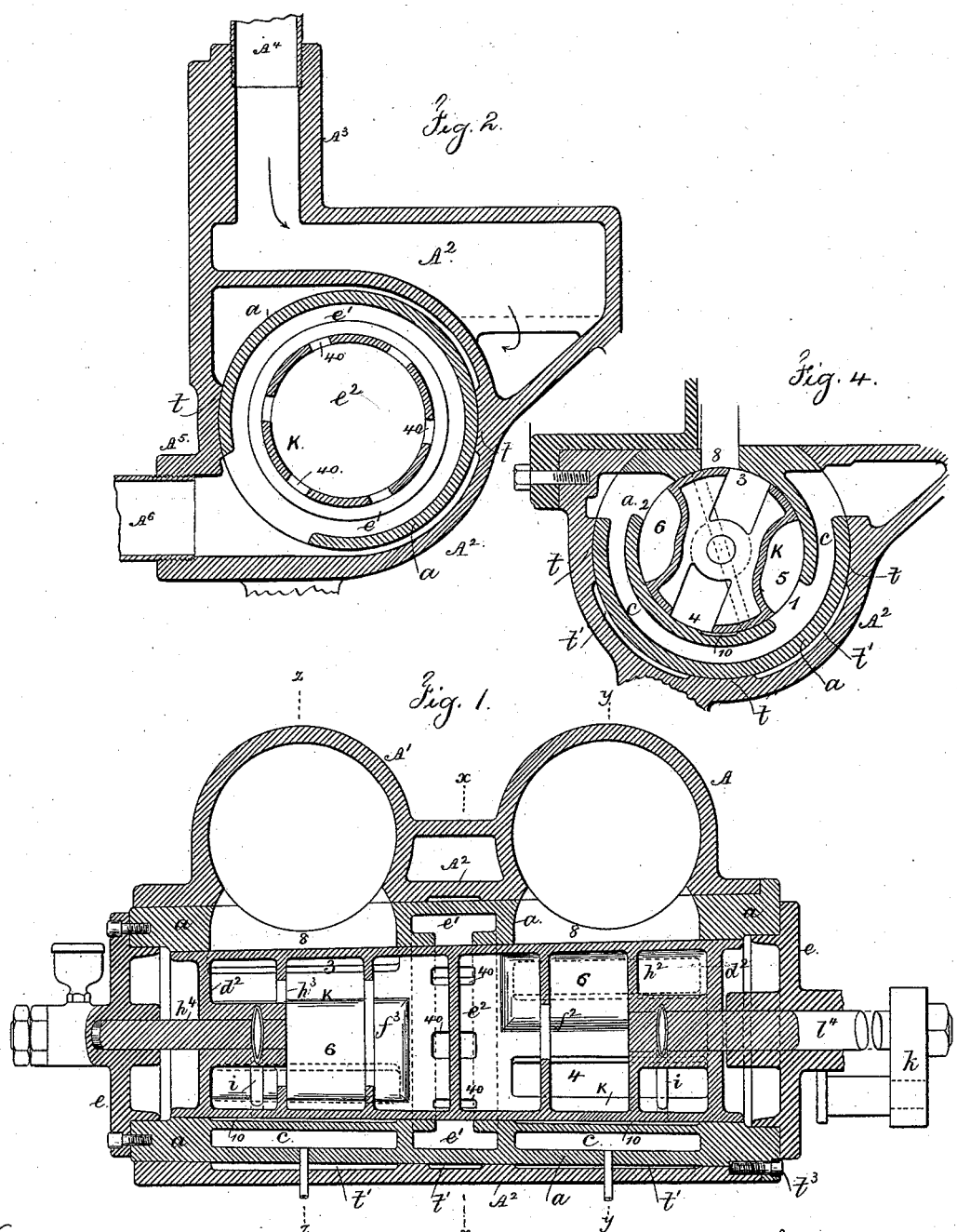

UNITED STATES PATENT OFFICE.

JOHN L. BOGERT, OF FLUSHING, NEW YORK.

ROTARY VALVE FOR STEAM-ENGINES.

SPECIFICATION forming part of Letters Patent No. 310,978, dated January 20, 1885.

Application filed June 25, 1884. (No model.)

*To all whom it may concern:*

Be it known that I, JOHN L. BOGERT, of Flushing, in the county of Queens and State of New York, have invented an Improvement in Rotary Valves for Steam-Engines, of which the following is a specification.

This invention has especial reference to the valves and valve-chest for twin single-acting engines; but the same may be used with double-acting engines when duplicated, and applied at both ends of the cylinder or cylinders.

In steam-engines, especially such as run at a high rate of speed, it is very important that the ports between the steam-cylinder and the valve should be as short as possible, so that there may be but little loss from the steam filling the ports, and so that there may not be loss of time by the distance the steam has to move through the ports. I make use of a valve similar to that shown in my patent granted May 6, 1884, No. 298,063, except in the particulars hereinafter named; and I place the same transversely to and below the ends of single-acting twin cylinders, and I provide a case for the valve with ports in it, which case is independent of the cylinders, being a separate casting introduced into a hole bored to receive it, and in order to shorten the length of the steam-port I cause one side of the case to pass into the cylinder at one side, and I bore off and remove the surplus metal of the valve-case, so that it coincides with the interior of the cylinder. By this means I am able to fit the valve and its case properly together before applying them to the cylinder, and the case having the ports in it is ground into place in the steam-chest of the cylinder, so as to fit tight therein, and it is bolted fast before the steam cylinder or cylinders are turned out. I introduce the steam-supply pipe between the twin cylinders and take off the exhaust below, and in the same plane, and I spread the steam-chest out below the twin cylinders, so as to reach the balanced rotative valve, and the exhaust is taken off through such valve to the central delivery-port.

In the drawings, Figure 1 is a vertical cross-section through the steam-cylinders and longitudinally of the valve. Fig. 2 is a cross-section of the valve at the line $xx$, passing through the steam and exhaust pipes. Fig. 3 is a cross-section of the valve at the line $yy$, passing through part of the engine-cylinder; and Fig. 4 is a similar view at the line $zz$.

The steam-cylinders A A' are cast together, and with the steam-chest $A^2$, and connection or hub $A^3$ for the steam-pipe $A^4$, and the connection or hub $A^5$ for the exhaust-pipe $A^6$. The valve itself is similar to that in my aforesaid patent, except in the particulars hereinafter named. Said valve K is hollow and nearly cylindrical, but sufficiently tapering to be ground into the valve-case and be steam-tight. It is provided with the recesses 5 and 6, and the ports 3 and 4 and the tubes $i$, passing across, so as to insure a perfect balance in the pressure, and the case $a$, surrounding the valve, is within the steam-chest $A^2$, and there are in such case the ports 1 and 2, that admit the steam into the recesses 5 and 6, for balancing the pressure, and the ports 8, leading into the steam-cylinders, and the ports, recesses, and parts for each steam-cylinder are the same; but they are in different planes passing longitudinally through the axis of the valve, so that the steam-port to one of the twin cylinders opens as the exhaust-port to the other cylinder opens, thereby adapting the valve to an engine with the cranks at 180° apart. These features of construction and the mode of operation of said valve are all set forth in my aforesaid patent, to which reference is hereby made. My present valve, however, is different in the following particulars: Between the sets of recesses and ports for one cylinder and those for the other cylinder there are openings at 40, which are preferably made all around such valve, and these are in position to correspond with the annular recess in the valve-case, so that there are free openings at all times from the inside of the valve to the exhaust-chamber $e'$ and exhaust-pipe $A^6$, so that steam passing from the cylinder A or A' through the ports 8 and exhaust-ports 3 of the valve reaches the interior of the valve, and goes away by such openings 40 and exhaust-pipe. The ends of the valve are preferably closed by the end plates, $d^2$ $d^3$; but the axes $h^4$ $l^4$, crank $k$, and adjusting-nuts are similar to those in my aforesaid patent, and the crank $k$ receives its motion from the eccentric $E^3$ and its rod $E^4$, so that the valve is given a partial rotary or oscillating movement, and admits steam alternately to the cylinders. There is a central partition at $e^2$, to strengthen the cylindrical valve, the exhaust-ports 40 being at each side of its edge, and there are also strengthening-partitions at $f^2$ $f^3$ $h^2$ $h^3$, which have holes through them to admit the exhaust-steam to pass by them freely. These partitions prevent the cylindrical valve being sprung by the pressure of the steam on the surface. The valve-case $a$ is separated from the steam-chest. Such case is provided with the ports and openings aforesaid, and it is turned off upon the outside, and the steam-chest is bored out true to receive the same. Usually there will be longitudinal ribs or "lands," as at $t$, for the valve-case to fit against, so as to render it unnecessary to bore out the entire interior of the steam-chest, and at the same time there are spaces at $t'$ containing dead air, that acts as a non-conductor to lessen the loss of heat and prevent condensation of the steam. The surfaces that come into contact will usually be ground together, so as to be steam-tight; and the case is secured firmly into its place by bolts $t^3$, inserted at the ends before the caps $e\ e$ are screwed to the steam-chest.

It will be observed that the steamways $e$ in the steam-chest nearly surround the case $a$, so that there is opportunity for the steam to enter the ports 1 and recesses 5, to balance the pressure upon opposite sides and cause such valve to move with little friction or wear, and the exhaust-way $e'$ surrounds the valve, the same being wider than the openings in the valve, in order that there may be ample space for the steam to pass to the exhaust-steam pipe.

The axis of the valve can be placed nearer to or farther from the axis of the steam-cylinders. There is economy in steam to place the parts as close as possible, so that when the cylinder is being bored the side of the valve-case will be turned out or removed to correspond with the interior of the cylinder; hence the port will be very short, and the action of the steam will be direct upon the piston as admitted by the valve.

The pipes $i$, extending across the valve for the object mentioned in my aforesaid patent, are shown as passing through the hubs and the shafts or axes of the valve. The recesses 10 are provided for balancing the pressure, as in said patent.

I do not herein claim any of the features of the plunger, the cranks, connecting-rods, or oiling devices, as they are the subject of separate applications of like date herewith.

I claim as my invention—

1. Twin horizontal steam-cylinders and plungers, in combination with a case crossing beneath the cylinders having openings or ports, and a hollow tapering valve within such case, substantially as specified.

2. The combination, with the twin cylinders and plungers, of a steam-passage between the cylinders, a case passing across beneath the cylinders, a cylindrical steam-valve, and the respective ports, substantially as specified.

3. In a steam-engine, a steam-cylinder, a cylindrical valve-chest across the cylinder near one end, a tubular lining or case to the valve and chest fastened into place, with a portion of one side thereof removed in boring out the steam-cylinder, so as to lessen the distance between the cylinder and valve, substantially as specified.

4. In a single-acting twin-cylinder engine, a tubular valve-case passing across near one end of the cylinders, with steam and exhaust openings and ports, in combination with a hollow oscillating valve within the chest, and mechanism for moving the same, substantially as specified.

5. The combination, with the tubular oscillating valve having steam and exhaust ports, of a valve-case surrounding the same, the twin steam cylinders, steam-pipe, and ports passing in between the cylinders and spreading out laterally beneath the cylinders, exhaust-openings near the center of the valve and its case, and an exhaust-pipe, substantially as specified.

6. The combination, with the cylindrical steam-valve having ports and central openings for the exhaust-steam, of a case surrounding the valve and having an annular exhaust-passage opening to the exhaust-pipe, substantially as set forth.

7. The combination, with the cylindrical valve having steam and exhaust ports, of a central partition, and of supporting-partitions having openings in them, substantially as set forth.

Signed by me this 16th day of June, A. D. 1884.

JOHN L. BOGERT.

Witnesses:
WILLIAM G. MOTT,
HAROLD SERRELL.